United States Patent [19]

Heintz

[11] 4,091,190
[45] May 23, 1978

[54] HERMETICALLY SEALED ALKALI METAL BATTERY CONTAINER

[75] Inventor: Walter K. Heintz, Westland, Mich.

[73] Assignee: Ford Motor Company, Dearborn, Mich.

[21] Appl. No.: 799,462

[22] Filed: May 23, 1977

[51] Int. Cl.² .............................................. H01M 2/02
[52] U.S. Cl. ..................................... 429/176; 429/104
[58] Field of Search ................. 429/176, 185, 30, 104; 220/9 R, 10; 206/524.1, 524.5

[56] References Cited

U.S. PATENT DOCUMENTS

| | | | |
|---|---|---|---|
| 3,868,273 | 2/1975 | Will et al. | 429/101 X |
| 3,959,013 | 5/1976 | Breiter | 429/185 |
| 3,960,596 | 6/1976 | Mitoff et al. | 429/185 |

Primary Examiner—Anthony Skapars
Attorney, Agent, or Firm—William E. Johnson; Keith L. Zerschling

[57] ABSTRACT

The invention is embodied in a hermetically sealed alkali metal battery container. Two opposed outer metallic casings each having an open end and a closed end are hermetically sealed to a ceramic ring which supports an inner casing of a solid alkali ion-conductive material. The hermetic seal is accomplished by means of a pressure accepting shoulder formed on one of the casings and a metal pressure sleeve which acts on the shoulder to draw the open ends of each of the casings into sealing engagement respectively with upper and lower surfaces of the ceramic ring.

4 Claims, 4 Drawing Figures

HERMETICALLY SEALED ALKALI METAL BATTERY CONTAINER

The invention herein described was made in the course of or under a contract or subcontract thereunder with the National Science Foundation.

BACKGROUND OF THE INVENTION

A recently developed type of secondary or rechargeable electrical conversion device comprises: (1) an anodic reaction zone containing a molten alkali metal anode-reactant, e.g., sodium, in electrical contact with an external circuit; (2) a cathodic reaction zone containing [a] a cathodic reactant comprising sulfur or a mixture of sulfur and molten polysulfide, which is electrochemically reversible reactive with the anodic reactant; [b] a solid electrolyte comprising a cation-permeable barrier to mass liquid transfer interposed between and in contact with the anodic and the cathodic reaction zones; and [c] electrode devices within the cathodic reaction zone for transporting electrons to and from the vicinity of the cation-permeable barrier. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the electrode by reaction of the cathodic reactant with the electrons conducted through the electrode from the external circuit. Because the ionic conductivity of the liquid electrolyte is less than the electronic conductivity of the electrode material, it is desirable during discharge that both electrons and sulfur be applied to and distributed along the surface of the electrode in the vicinity of the cation-permeable solid electrolyte.

During the charge cycle of such a device when a negative potential larger than the open circuit cell voltage is applied to the anode the opposite process occurs. Thus, electrons are removed from the alkali metal polysulfide by charge transfer at the surface of the electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfer.

It is the principal object of this invention to provide a structure for containing an alkali metal battery in which electrical insulation is provided between the anodic and cathodic reaction zones and a secure seal is formed so that the reactants are not lost from the battery.

SUMMARY OF THE INVENTION

This invention is directed to a structure for containing an alkali metal battery and, more particularly, to a structure for containing such a battery which provides effective electrical insulation of the battery's anodic and cathodic zones and a seal against loss of reactants from such zones.

In accordance with the general principles of this invention, a structure for containing an alkali metal battery includes a ceramic ring having top and bottom surfaces. An inner casing formed of a solid alkali ion-conductive material and having an open end and a closed end is attached near its open end to an interior surface of the ceramic ring so that the inner casing extends downwardly from the bottom surface of the ceramic ring.

A first metal outer casing with an open end and a closed end surrounds the inner casing and is speced therefrom. The open end of the first casing is located adjacent the bottom surface of the ceramic ring. A second metal outer casing has an open end and a closed end. The open end of the second metal outer casing is located adjacent the top surface of the ceramic ring. A pressure accepting shoulder is formed on the second metal outer casing near its open end.

A metal pressure sleeve has both an open end and an end having a pressure applying shoulder formed thereon. The open end of the pressure sleeve encircles the first metal casing and is bonded thereto at such a position that the pressure applying shoulder thereof applys pressure to said pressure accepting shoulder of the second metal outer casing. This action brings the open ends of the first and the second metal outer casings respectively into engagement with the bottom and the top surfaces of the ceramic ring to provide liquid tight seals therebetween. Electrical insulation is provided between the pressure applying shoulder and the pressure receiving shoulder for electrically insulating the first metal outer casing from the second metal outer casing.

DESCRIPTION OF THE PREFERRED EMBODIMENT

The type of secondary electrical conversion batteries to which this invention relates are disclosed in the following U.S. Pat. Nos.: 3,404,035; 3,404,036; 3,446,677; 3,458,356; 3,468,709; 3,468,719; 3,475,220; 3,475,223; 3,475,225; 3,535,163 3,719,531; and 3,811,493.

Figure 1:
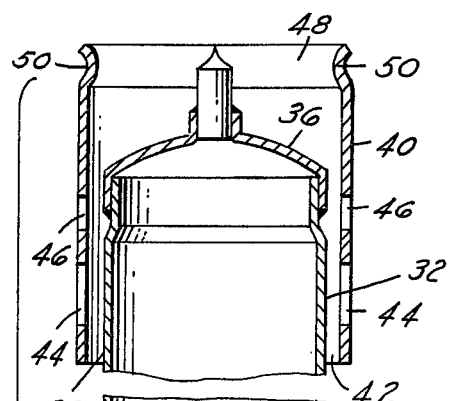
FIG. 1 is an elevation view, in cross-section, of the alkali metal battery of this invention in a disassembled condition.
Figure 2:
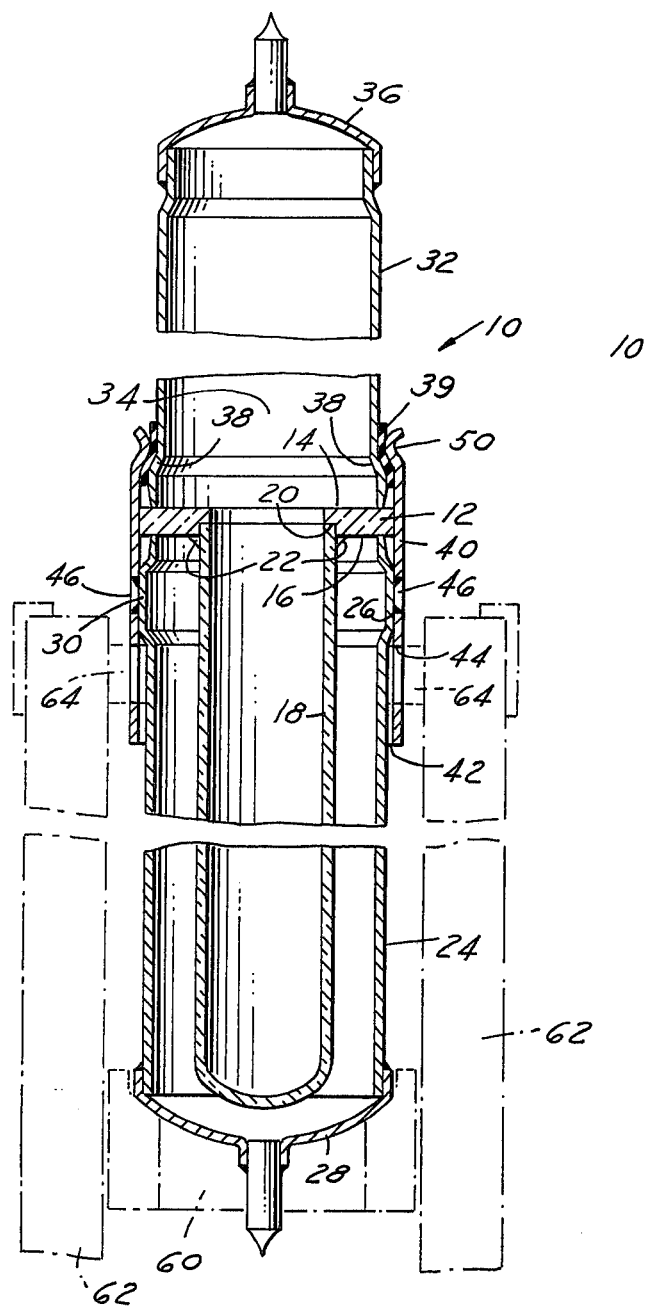
FIG. 2 is an elevation view, in cross-section, of the hermetically sealed alkali metal battery of this invention in an assembled condition.

In FIGS. 1 and 2 there is seen a hermetically sealed alkali metal battery designated generally by numeral 10. This battery includes a ceramic ring 12 which has a top surface 14 and a bottom surface 16. The ceramic material may be formed from a material such as alpha alumina of high purity, such as 99.8%.

An inner casing 18 of a solid alkali ion-conductive material is in the form of a closed end tube. This casing is used as a reaction zone separator and is made from a material which will permit the transfer of ions of an anodic reactant therethrough to a cathodic reactant. The barrier may have a thickness in the range of about 20 to 2,000 microns and may be made of material such as glasses and polycrystalline ceramic materials as is well known in the art. One material which is extremely useful is beta-type alumina or sodium beta-type alumina. The inner casing is bonded near its open end within and to an interior surface 20 of the ceramic ring 12 by means of a glass seal 22 so that the inner casing extends downwardly from the bottom surface 16 of the ceramic ring.

A first outer metal casing 24 has an open end 26 and a closed end 28. This casing surrounds the inner casing 18 and is spaced therefrom. This casing is made from metal such as 446 stainless steel. The first metal casing has an enlarged diameter portion 30 near its open end 26. The purpose of this enlargement will be described later.

A second metal casing 32 also has an open end 34 and a closed end 36. As viewed in FIG. 2, this second metal outer casing is located with its open end in contact with the top 14 of the ceramic ring 12. The second metal outer casing member also has a pressure accepting shoulder 38 formed about the diameter of the casing near its open end. The purpose of this shoulder will be described later. The shoulder also has an electrical insulating member 39 thereon. This can be made of nickel oxide for example. The second metal casing may be made from the same material as the first metal casing.

A metal pressure sleeve 40 has a lower open end 42 which has the same internal diameter as the outside diameter of the enlarged diameter portion 30 of the first metal casing 24. The lower end of the pressure sleeve has a first set of openings 44 therethrough on opposite sides thereof as well as a second set of openings 46 on opposite sides thereof. The purpose of both sets of openings will be described later. The pressure sleeve also has an upper open end 48. A pressure applying shoulder 50 is formed on the upper open end of the pressure sleeve.

Having generally described the parts of the assembly making up the alkali metal battery of my invention, I will now describe how the battery is assembled.

Reference is made to FIG. 2. In order to assemble an alkali metal battery 10 of this invention, the closed end of 28 of the first metal casing 24 is positioned in a holding fixture 60. The ceramic ring, with the inner casing 18 projecting downwardly therefrom, is placed inside the first metal casing so that the bottom surface 16 of the ceramic ring comes in contact with the edge defining the open end 26 of the first metal casing. The second metal casing 32 is positioned such that its open end 34 comes in contact with the top 14 of the ceramic ring 12. The pressure sleeve 40 is then positioned over the second metal casing and pulling members 62 having projecting portions 64 thereon are arranged so that the projecting portions thereof are received within the first set of openings 44 in the lower open end 42 of the pressure sleeve 40.

The pulling members 62 are moved downwardly as viewed in FIG. 2. Such action brings the pressure applying shoulder 50 of the pressure sleeve 40 into engagement with the pressure accepting shoulder 38 of the second metal casing 32, such action putting the pressure sleeve into tension. This action brings both the open end 34 of the second metal casing into engagement with the top surface 14 of the ceramic ring 12 and the open end 26 of the first metal casing 24 firmly into engagement with the bottom 16 of the ceramic ring putting these casings into compression. As the pulling members 62 hold the pressure applying shoulder 50 and the pressure accepting shoulder 38 with the interposed electrical insulating member 39 in a pressure contact relationship, weldments are formed between the pressure sleeve 40 and the first metal casing 24. These weldments are formed at the second set of openings 46 which are located over the enlarged diameter portion 30 of the first metal casing. When the weldments have been formed, the pulling members 62 are released and removed from the openings 44 but the various parts of the battery remain in tension and compression. This completes the assembly of the battery 10.

Figure 3:
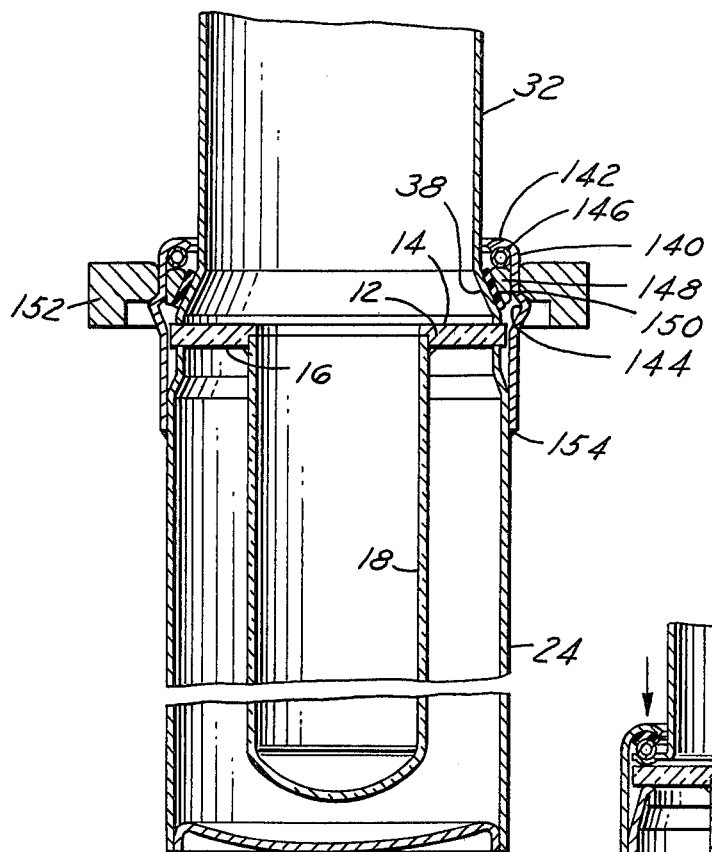
FIGS. 3 and 4 are elevation views, in cross-section, of alternate forms of construction for a portion of the alkali metal battery of this invention.

In FIG. 3, a slightly different approach to sealing an alkali metal battery is shown which uses the same general concept as shown in FIGS. 1 and 2. In this FIG. 3, similar numbers depict similar parts. With reference to FIG. 3, a pressure sleeve 140 has a pressure applying shoulder 142 and a pressure accepting shoulder 144. In this design, there is a metal O-ring 146, a wedge 148 and an electrical insulator band 150 between the pressure applying shoulder 142 and the pressure accepting shoulder 38. A pressure applying ring 152 encircles and engages the pressure accepting shoulder 144 of the pressure sleeve 140. When the first metal casing 24 is seated on a stationary surface and pressure applied by the pressure applying ring 150, the pressure applying shoulder 142 acts on the O-ring 146, the wedge 148, the insulator band 150 and the pressure accepting shoulder 38 of the second metal casing 32. This action forces the open end of the first metal casing into contact with the top surface 14 of the ceramic ring 12 and the open end of the first metal casing 24 into engagement with the bottom surface 16 of the ceramic ring. When these elements are all in firm contact, the pressure sleeve 140 is welded near its bottom end by a weldment 154 to the first metal casing thereby to complete assembly of the hermetically sealed alkali metal battery.

Figure 4:
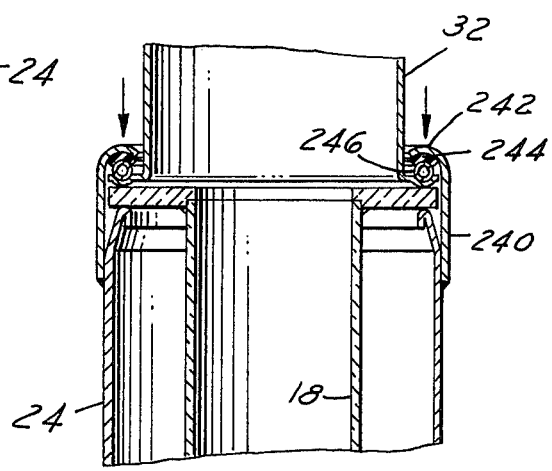

In FIG. 4, another embodiment of the apparatus of this invention is disclosed. In this embodiment, a pressure sleeve 240 has a pressure applying shoulder 242 which acts on an insulator band 244 and an O-ring 246 to apply pressure to a portion of the open end of the second metal casing 32 folded under the O-ring. Pressure, of course, is applied on the pressure sleeve in the directions of the arrows in FIG. 4 to form a hermetic seal. As in the other embodiments, the pressure sleeve 240 is welded to the first outer metal casing 24 when all of the elements have been drawn into proper sealing contact.

There has been disclosed herein a sealed alkali metal battery system. Many modifications of this system may be made by those skilled in the art which fall within the true spirit of this invention. It is intended that all such modifications be included wthin the scope of the appended claims.

What I claim is :

1. A hermetically sealed alkali metal battery container comprising:
   a ceramic ring having top and bottom surfaces;
   an inner casing of a solid alkali ion-conductive material with an open end;
   sealing means for bonding said inner casing adjacent its open end to said ceramic ring so that said inner casing extends downwardly from said bottom surface of said ceramic ring;
   a first metal outer casing with an open end and a closed end, said first metal outer casing surrounding said inner casing and spaced therefrom;
   a second metal outer casing with an open end and a closed end, said open end being located adjacent said top surface of said ceramic ring;
   a pressure accepting shoulder formed on said second metal outer casing near said open end thereof;
   a metal pressure sleeve having both an open end and an end having a pressure applying shoulder formed thereon, said open end of said pressure sleeve at least in part encircling said first metal casing and bonded thereto at such a position that said pressure applying shoulder applies sufficient pressure to said pressure accepting shoulder of said second metal outer casing that said open ends of said first and said second metal outer casings are drawn respectively into engagement with said bottom and said top surfaces of said ceramic ring to provide liquid tight seals therebetween; and electrical insulation means between said pressure applying shoulder and said pressure receiving shoulder for electrically insulating said first metal outer casing from said second outer metal casing.

2. A hermetically sealed alkali metal battery container comprising:

a ceramic ring having top and bottom surfaces;

an inner casing of a solid alkali ion-conductive material with an open end;

sealing means for bonding said inner casing adjacent to its open end to said ceramic ring so that said inner casing extends downwardly from said bottom surface of said ceramic ring;

a first metal outer casing with an open end with a welding zone adjacent thereto and a closed end, said outer casing surrounding said inner casing and spaced therefrom;

a second metal outer casing with an open end and a closed end, said open end being located adjacent said top surface of said ceramic ring, said second metal outer casing being flared outwardly near said open end to provide an angularly inclined, outwardly directed pressure accepting shoulder on said second metal outer casing;

a metal pressure sleeve having both an internal diameter equal to the outer diameter of said welding zone portion of said first metal casing and an end having a pressure applying shoulder formed thereon generally matching in angular configuration the angular configuration of said pressure accepting shoulder formed on said second metal outer casing, said pressure sleeve also having a plurality of opening therethrough at a position adjacent said welding zone of said first metal outer casing;

said metal pressure sleeve being bonded to said welding zone of said first metal outer casing by weldments at said openings of said pressure sleeve whereby said pressure sleeve applies sufficient pressure through said pressure applying shoulder thereof to said pressure accepting shoulder of said second metal outer casing that said open ends of said first and said second metal outer casings are drawn respectively into engagement with said bottom and said top surfaces of said ceramic ring to provide liquid tight seals therebetween, and;

electrical insulation means between said pressure applying shoulder and said pressure receiving shoulder for electrically insulating said first outer metal casing from said second outer metal casing.

3. A hermetically sealed alkali metal battery container comprising:

a ceramic ring having top and bottom surfaces;

an inner casing of a solid alkali ion-conductive material with an open end;

sealing means for bonding said inner casing adjacent to its open end to said ceramic ring so that said inner casing extends downwardly from said bottom surface of said ceramic ring;

a first metal outer casing with an open end and a closed end, said outer casing surrounding said inner casing and spaced therefrom;

a second metal outer casing with an open end and a closed end, said open end being located adjacent said top surface of said ceramic ring;

a pressure accepting shoulder formed on said second outer metal casing near said open end thereof by flaring said open end of said second metal outer casing outwardly, the largest diameter of said pressure accepting shoulder being smaller than the diameter of said first metal outer casing;

a metal pressure sleeve having both an open end having an internal diameter approximating the diameter of said first metal outer casing and an end having a pressure applying shoulder formed thereon;

a metallic O-ring and a metal load-ring interposed between said metal pressure applying shoulder of said pressure sleeve and said pressure accepting shoulder of said second metal outer casing, said open end of said pressure sleeve encircling said first metal casing member and being welded thereto at such a position that said pressure applying shoulder acts on said metallic O-ring and metal load-ring to apply sufficient pressure to said pressure accepting shoulder of said second metal outer casing that said open ends of said first and said second metal outer casings are drawn respectively into engagement with said bottom and said top surfaces of said ceramic ring to provide liquid tight seals therebetween, and;

electrical insulation means between said pressure accepting shoulder and said metal load-ring for electrically insulating said first outer metal casing from said second outer metal casing.

4. A hermetically sealed alkali metal battery container comprising:

a ceramic ring having top and bottom surfaces;

an inner casing of a solid alkali ion-conductive material with an open end;

sealing means for bonding said inner casing adjacent to its open end to said ceramic ring so that said inner casing extends downwardly from said bottom surface of said ceramic ring;

a first metal outer casing with an open end and a closed end, said outer casing surrounding said inner casing and spaced therefrom;

a second metal outer casing with an open end and a closed end, said open end being located adjacent said top surface of said ceramic ring, said open end having an annular flange formed therearound;

a metal pressure sleeve having both an open end having an internal diameter approximating the diameter of said first metal outer casing and an end having a pressure applying shoulder formed thereon;

a metallic O-ring interposed between said metal pressure applying shoulder of said pressure sleeve and annular flange of said second metal outer casing, said open end of said pressure sleeve encircling said first metal casing member and being welded thereto at such a position that said pressure applying shoulder acts on said metallic O-ring to apply sufficient pressure to said annular flange of said second metal outer casing that said open end of said first metal outer casing and said annular flange of said second metal outer casing are drawn respectively into engagement with said bottom and said top surfaces of said ceramic ring to provide liquid tight seals therebetween, and;

electrical insulation means between said pressure applying shoulder and said annular flange for electrically insulating said first outer metal casing from said second outer metal casing.

* * * * *